Dec. 18, 1956  D. SHEPPARD  2,774,514
COMBINATION SALT AND PEPPER SHAKER
Filed Jan. 25, 1954
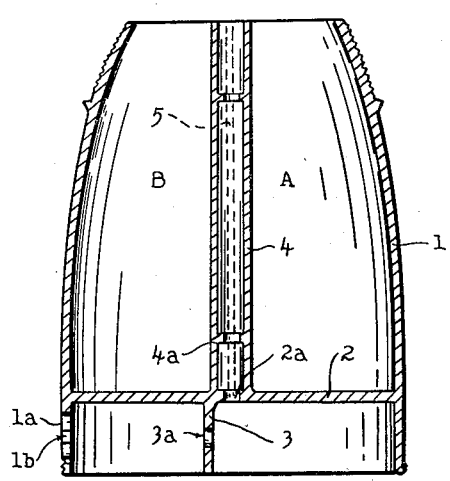
FIG.3.
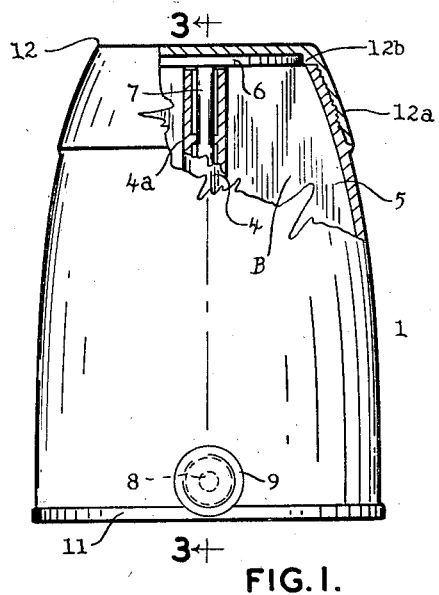
FIG.1.
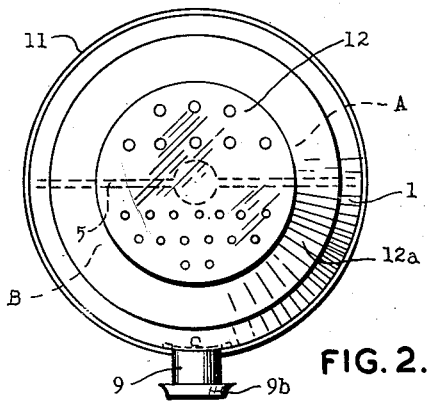
FIG.2.
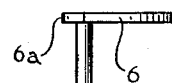
FIG.4.
FIG.5.
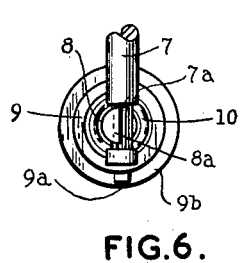
FIG.6.
Inventor
DONALD SHEPPARD
by W. Irwin Haskett
Attorney

United States Patent Office 2,774,514
Patented Dec. 18, 1956

2,774,514

COMBINATION SALT AND PEPPER SHAKER

Donald Sheppard, Ottawa, Ontario, Canada, assignor of one-half to Wilfred Charron, Eastview, Ontario, Canada Application January 25, 1954, Serial No. 406,040

2 Claims. (Cl. 222—142.9)

This invention relates to improvements in a combination salt and pepper shaker and appertains particularly to one of novel, attractive and simplified structure from which either salt or pepper may be selectively dispensed.

An object of the invention is to provide an open top two compartment container with a shutter valve selectively closing the open top of one compartment or the other and leaving the open top of the other compartment clear for filling or discharge.

A further object of the invention is to provide a combination salt and pepper shaker with a shutter valve normally closing the pepper compartment outlet and a plunger operated, rack and pinion mechanism operable to rotate such shutter valve through 180° to open the pepper compartment outlet and close the salt compartment outlet.

A further object of the invention is to provide a simple, efficient and reliable valve actuating mechanism that may be easily assembled in the shaker, is not subject to normal removal or displacement and none of which excepting only the thumb engaged button is exposed when using or refilling the shaker.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a front elevation of a preferred embodiment of the invention;

Figure 2 is a plan view thereof;

Figure 3 is a vertical section of the container body, as taken on line 3—3 of Figure 1;

Figure 4 is a side elevation of the valve and its operating mechanism, with a part thereof in section;

Figure 5 is a top plan view of this valve and mechanism; and

Figure 6 is an enlarged rear end view detail of the plunger rack and valve stem pinion.

Usually combination salt and pepper shakers have had separate valves or shutters for each compartment and have had the plugged filling openings in the bottom, both of which are excessive and undesirable or have provided only awkward and impractical access to the top. Furthermore, the valve or valves and actuating mechanism therefor have been expensive to make, difficult to assemble and cumbersome or unreliable. To overcome these objections, the present shaker has an open top two compartment container, across the top of which a shutter valve operates to close one compartment or the other and is in turn covered by a readily removable, close-fitting, perforated shaker cap giving the dispenser a normal and attractive appearance while affording easy and rapid access to the compartments for refilling; and a positively acting valve operating mechanism that may be readily assembled yet locks itself against disarrangement and displacement.

The preferred embodiment of the combination shaker here shown includes a cylindrical body 1 adapted to stand vertically and open at both top and bottom. A short distance above the open bottom is a horizontal platform 2 with a vertical off center partition 3 further dividing the shallow lower section of the body in which the valve actuating mechanism to be subsequently described is housed. From the platform 2 a hollow tube 4 rises coaxial with the cylindrical body to the level of the top thereof and from diametrically opposite sides of the tube radial wings 5 extend to the inside of the cylindrical body wall to provide a transverse partition dividing the upper and main section of the body into two separate open topped compartments A and B for salt and pepper respectively.

A shutter valve 6 in the form of a semi-circular disk of a size to cover one-half the open top of the body 1 and projecting on the opposite side at the center to reach to the perimeter of the tube 4, as seen at 6ᵃ, is secured to the upper end of a spindle stem 7 that runs upwards through the hollow axial tube 4 that is provided at spaced intervals with inwardly extending annular webs 4ᵃ that act as spindle bearings, the free lower end of the spindle 7 passing through a perforation 2ᵃ in the platform 2 to terminate just above the bottom of the body 1. Near but above its lower end the spindle 7 is of reduced diameter and provided with pinion gear teeth as at 7ᵃ which is engaged by a toothed rack 8ᵃ cut in a horizontal rod 8 near but spaced in from one end thereof and on whose other end a push button 9 is securely and nonrotatably mounted as by moulding. Both the transverse vertical partition 3 and the wall of the body 1 have aligned openings 3ᵃ and 1ᵃ respectively to pass and serve as bearing supports for the rod and button, the opening 1ᵃ being of substantially larger diameter and including also horizontally extending notches 1ᵇ on opposite sides to pass a pair of lugs 9ᵃ that project from diametrically opposite sides of the button 9 spaced in from its outer end that is finished with an exteriorly flared rim 9ᵇ. About the shaft 8, the button 9 at its inner end has a concentric well 9ᶜ to accommodate one end of a coil spring 10 mounted on the rod 8 and compressed between the partition 3 and the button to urge the button and rack rod outwards. The rod 8 with its toothed rack in horizontal position is inserted through the openings 1ᵃ and 3ᵃ in which position the button lugs 9ᵃ register with and pass through the perforation notches 1ᵇ and in the course of which insertion the spring 10 is compressed against the partition 3. After the lugs 9ᵃ are within the body 1, the button is rotated through 90 degrees thereby moving the lugs out of registry with the notches and thereby preventing the outward displacement of the button. At the same time, the toothed rack 8ᵃ is turned into vertical position and the bottom of the spindle stem 7 is dropped through the tube 4 to rest on the racked rod 8 then both rod and stem are sprung slightly to allow the spindle end below the pinion teeth 7ᵃ to pass the rod and spring back into place with the rack engaging the pinion as seen in Figures 4, 5 and 6, with neither rod or stem subject to accidental disconnection. Further, it is desired that the teeth formed on the rack and pinion be such that on the complete inward movement of the rod within the thrust allowed by the rack teeth, the spindle stem will rotate 180 degrees and similarly rotate 180 degrees in the opposite direction under action of the compressed spring on the release of the rod button.

A bottom closure plate 11 with an upstanding interiorly threaded flange screws on the bottom of the body to enclose the valve actuating mechanism and a perforated shaker head 12 with an interiorly threaded skirt 12ª screws on the top of the body 1 whose outer wall at the top is correspondingly threaded. To assure a close yet nonbinding fit between the top of the shutter valve 6 and the under side of the perforated cap or head 12, an inwardly extending step or shoulder 12ᵇ is formed at the junction of the top 12 and its skirt 12ª to abut the top edge of the wall of the cylindrical body and of a depth just exceeding the thickness of the valve. No undischarged salt or pepper can thus lodge on the body wall or the top of the spindle housing tube 4 but must fall back into its respective compartment so that no spilling can occur when the perforated cap is removed, as for refilling, yet both compartments are easily and quickly accessible on the removal of the perforated screw cap, the salt compartment when the cap is removed and then the pepper compartment on rotation of the valve by pressing the button.

The shaker may be made of various materials and in a wide range of shapes and designs but the illustrated form is neat and simple and I prefer to construct the body, base closure and shaker cap of moulded plastic and the valve and its operating mechanism, except for the plastic button, of stainless steel to avoid corrosion.

From the foregoing description taken in connection with the accompanying drawings, it will be manifest that a combination salt and pepper shaker is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new is:

1. A combination salt and pepper shaker comprising a cylindrical container open at top and bottom with a horizontal platform spaced a short distance above the open bottom of said container, said container being exteriorly threaded about its open top, a hollow tube coaxial with said cylindrical container rising from said platform to the level of the top of said container and a pair of radial wings extending from diametrical opposite sides of said tube to the wall of the container dividing the section of said container above said platform into two companion compartments each with an open top and a closed bottom; a semi-circular shutter valve normally covering the open top of one compartment; a spindle stem secured to said valve and depending through said tube and extending below said platform; manually operable, spring retracted mechanism housed in said container below said platform engaging the lower end of said valve spindle stem for rotating it through 180 degrees; a closure plate threadedly attached to the open bottom of said cylindrical container and enclosing said mechanism; and a perforated shaker cap applied to the top of said cylindrical container to overlie and enclose said shutter valve in close fitting nonbinding relation, said cap being readily removable for refilling the compartments without interference by the shutter valve or its operating mechanism, said perforated shaker cap having a depending, interiorly threaded skirt that screws on the exteriorly threaded top of said cylindrical container and said cap also having an interiorly disposed inwardly extending step at its junction with said skirt that abuts the top edge of the container, the depth of said step just exceeding the thickness of said shutter valve.

2. A combination salt and pepper shaker comprising a cylindrical container open at top and bottom with a horizontal platform spaced a short distance above the open bottom of said container, a hollow tube coaxial with said cylindrical container rising from said platform to the level of the top of said container and a pair of radial wings extending from diametrical opposite sides of said tube to the wall of the container dividing the section of said container above said platform into two open topped compartments; a semi-circular shutter valve normally covering the open top of one compartment; a spindle stem secured to the under side of said shutter valve, said stem depending through said hollow tube and passing through said platform with its lower end having a portion of reduced diameter and provided with pinion gear teeth; a transverse off-center vertical partition continuing from said platform to the bottom of the container with an opening therethrough and said container having a registering but larger opening in its wall with horizontally extending notches on opposite sides; a rod passing through the opening in said partition with a toothed rack on its inner end meshing with the pinion gear teeth on said spindle stem; a push button secured on the outer end of said rod, coaxial therewith, and slidable in the opening in the wall of said container, said button having a pair of lugs projecting from diametrically opposite sides for insertion through the said horizontal notches of the aforementioned wall opening and on rotation of said button to be moved out of registry with said notches to engage the inside of said container wall to limit the outward movement of said button; and a coil spring on said rod compressed between said push button and said vertical partition; the toothed rack on said rod being horizontal when inserted to allow the said button lugs to pass through the said notches in the wall opening and the inner end of said rod and the lower end of said spindle stem both being flexible and so supported by the container to allow of their being flexed out of alignment when said button is being inserted and then back into place with said toothed rack engaging the pinion gear teeth on the stem when said button is rotated through 90 degrees to move the button lugs out of registry with the notches, whereby said valve stem, rod and push button cooperate to secure the assembled valve actuating mechanism in place in the container.

References Cited in the file of this patent
UNITED STATES PATENTS

| | | |
|---|---|---|
| 1,282,081 | Helbing | Oct. 22, 1918 |
| 1,284,248 | Crabtree | Nov. 12, 1918 |
| 1,437,345 | Marr | Nov. 28, 1922 |
| 2,144,981 | Jones | Jan. 24, 1939 |
| 2,650,001 | Jeunesse | Aug. 25, 1953 |